United States Patent
Huang et al.

(10) Patent No.: US 7,895,152 B2
(45) Date of Patent: *Feb. 22, 2011

(54) METHOD, APPARATUS AND SYSTEM FOR BUSINESS PERFORMANCE MONITORING AND ANALYSIS USING METRIC NETWORK

(75) Inventors: Pu Huang, Yorktown Heights, NY (US); Hui Lei, Scarsdale, NY (US); Lipyeow Lim, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/273,629

(22) Filed: Nov. 19, 2008

(65) Prior Publication Data

US 2009/0138549 A1    May 28, 2009

Related U.S. Application Data

(63) Continuation of application No. 11/328,026, filed on Jan. 9, 2006, now Pat. No. 7,509,308.

(51) Int. Cl.
*G06F 17/30* (2006.01)

(52) U.S. Cl. .................................. 707/602; 707/603
(58) Field of Classification Search .................. None
See application file for complete search history.

(56) References Cited

U.S. PATENT DOCUMENTS

| 5,890,146 | A | 3/1999 | Wavish et al. |
| 6,836,773 | B2 * | 12/2004 | Tamayo et al. ............ 1/1 |
| 6,912,533 | B1 * | 6/2005 | Hornick ............... 707/700 |
| 6,920,458 | B1 * | 7/2005 | Chu et al. ............. 707/600 |
| 2003/0055707 | A1 | 3/2003 | Busche et al. |
| 2003/0065543 | A1 | 4/2003 | Anderson |

\* cited by examiner

*Primary Examiner*—Baoquoc To
(74) *Attorney, Agent, or Firm*—Whitham, Curtis, Christofferson & Cook, P.C; Stephen C. Kaufman

(57) ABSTRACT

A metric network provides a descriptive model that explicitly expresses the relationships among all metrics of a business enterprise. Performance of each single business entity in the operational level is measured by a set of primitive metrics, each of which measures a specific aspect of the business entity. The primitive metrics construct the base on which the whole metric network is built.

3 Claims, 7 Drawing Sheets

METHOD, APPARATUS AND SYSTEM FOR BUSINESS PERFORMANCE MONITORING AND ANALYSIS USING METRIC NETWORK

BACKGROUND OF THE INVENTION

1. Field of the Invention

The present invention generally relates to business method performance monitoring and analysis and, more particularly, provides models, technologies and tools to maintain all possible relationships between business metrics, and exploit these relationships for business analysis.

2. Background Description

An often-quoted axiom says, "You cannot manage what you cannot measure." This is also true for business. Nowadays, enterprises have realized that monitoring business performance in a continuously manner is crucial to achieve operational excellence, and to better align daily operations with long-term business strategies.

An enterprise executes various business processes in its every day operations. These processes often span several functional units within the enterprise, sometimes even extend to link with partners' processes; they usually involve many employee roles, assets, and resources; they may be support by Information Technology (IT) systems, or be executed in ad hoc manner by humans manually. To monitor enterprise-wide business performance, we need to continuously collect metric data from these business processes, aggregate the lower-level operational metrics to build higher-level Key Performance Indicators (KPIs).

SUMMARY OF THE INVENTION

According to one aspect of the invention, there is provided a new software apparatus called Metric Network. Metric Network is a descriptive model that explicitly expresses the relationships among all metrics of concern. There is also provided a set of analytical technologies that exploit Metric Network for business analysis.

Performance of each business entity in the operational level is measured by a set of primitive metrics, each of which measures a specific aspect of the business entity. The primitive metrics construct the base on which the whole Metric Network is built.

We provide a system called metric network for enterprise-wide business performance monitoring. A metric network consists of metrics, metric repositories, aggregation agents, and knowledge agents. Metric repositories store metric values. These repositories are usually distributed, close to the business processes they are collecting metrics from. Aggregation agents automatically aggregate lower-level metrics to create higher-level KPIs in real time. This ensures that every day operational measures are reflected into KPIs in a timely fashion, which is essential to make executive decisions. Agents and metric repositories communicate through message passing, which makes them loosely coupled, and ensures that it is easy to enhance features by adding more metrics and agents.

Metrics collected are not just for presentation. Our metric network also supports generic what-if analysis. In a what-if analysis, managers submit hypothetical business scenarios to a knowledge agent, which in turn responds with the estimated outcomes of these scenarios. What-if analysis is widely used in business to identify root causes, predict futures, and evaluate strategy/operation changes. A key feature of our metric network is that it supports learning knowledge agents, which automatically build up models to describe relationship between metrics based on data.

Using a metric network, managers at different level of an enterprise hierarchy can address their local concerns: they can use their own aggregation agents to build metrics that measure local performance; they can use their own knowledge agents to analyze business scenarios of their concern. They can do all of these in a metric network without interference with each other. However, since all the managers share the same metric network, all this localized knowledge about how business is operated in a daily base is integrated through and incorporated in the metric network. This knowledge can be shared by the whole enterprise. Higher level executes can reuse localize metrics to monitor enterprise-wide performance, to do deeper what-if analysis by chaining up knowledge agents deployed at local levels. In this sense, our metric network is an enterprise-wide knowledge integration tool.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The preferred embodiment is implemented on a client/server system; however, those skilled in the art will recognize that the invention may be practiced on any computer system that is used interactively by a human user. Such a system could be, for example, a notebook computer which is never connected to a network but which may be periodically connected to local databases.

Figure 1:
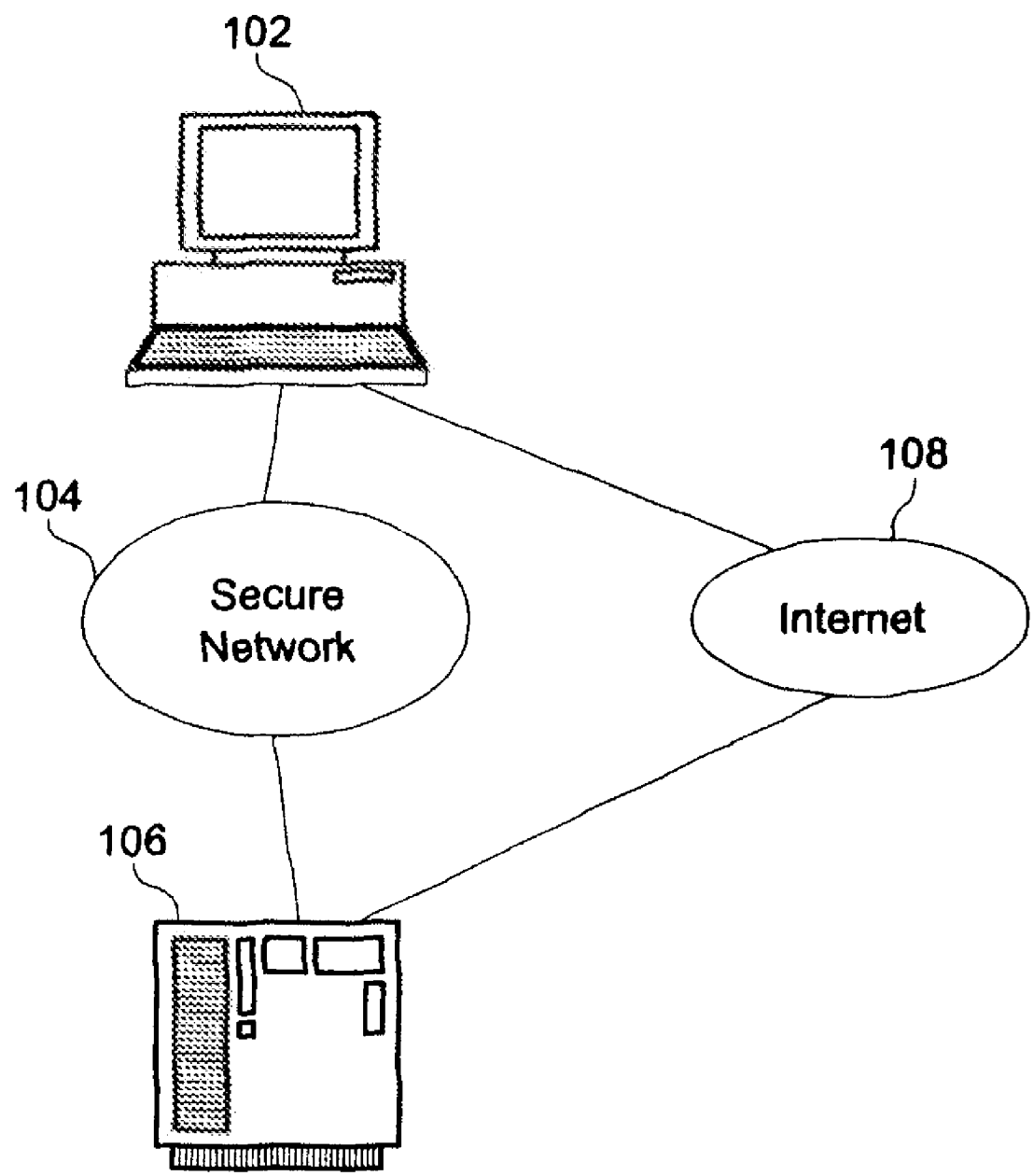
FIG. 1 is a simplified block diagram of a client/server system.

Referring now to the drawings, and more particularly to FIG. 1, there is shown, in simplified block diagram form, a client/server system on which the present invention may be implemented. A client 102, such as a personal computer (PC) is connected via a secure network 104, such as a local area network (LAN), to a server 106. Both the client 102 and the server 106 may be connected to a wide area network (WAN) or global network, such as the Internet 108. Connection to the Internet 108 may be limited to the server 106, and access to the Internet by the client 102 would then be via the server 106 through the secure network 104. In any case, the client/server system would be protected a hardware and/or software firewall (not shown).

As will become clear from the following description, the invention can be implemented at any one of the client 102, the server 106 or, in some cases, by a third party over the Internet 108. In some applications, the implementation may be a combination of two or more of these. For example, the client 102 might keep track of idle time and report the history to the server 106 which would determine the priority of and initiate the various maintenance tasks. Rather than the server 106 performing this last function, a third party service provider could perform the function. Various other implementations will suggest themselves to those skilled in the art, and a specific implementation will depend on a particular implementation and company policy.

In practice, the client/server network is much more complex than depicted in FIG. 1. Typically, there are a great many clients 102, and these may be a variety of desktop and laptop PCs, such as IBM's ThinkCentre series desk top PCs and IBM's ThinkPad series lap top PCs. Moreover, the secure network 104 may be a combination of hardwired and wireless infrastructure. Also, there are a plurality of servers 106, arranged in a server "farm" performing various functions, such as IBM's xSeries Express and BladeCenter servers. In the practice of the invention, the processes performed may be performed solely on clients 102, solely on the servers 106, or a combination of client and server operations.

The several clients in the client/server system shown in FIG. 1 will not all have precisely the same architecture. The architecture(s) of server(s) 106 is similar to that of the client 102 shown in FIG. 2 but differs primarily in the I/O functions supported. Each of the client 102 and the server 106 will have a software operating system (OS) loaded, but the operating systems will differ somewhat between client and server, again to support the functions of those computers.

We use the term "monitored object" to refer to any business entity whose performance is of the concern and thus is measured. A monitored object is usually measured by multiple metrics with a single metric measuring a specific aspect of the object. Metrics directly measuring a monitored object are called primitive metrics; metrics that are aggregated from lower-level metrics (primitive or derived) are called derived metrics.

A metric network consists of metrics, metric repositories and agents. Each metric (primitive or derived) has a single repository, which is the place where all the historical metric values are stored; each metric repository hosts a single metric. There are two kinds of agents: aggregation agents combine lower-level metrics to create higher-level metrics; knowledge agents maintain the knowledge of relationship between metrics that is essential for business analysis.

Figure 2:
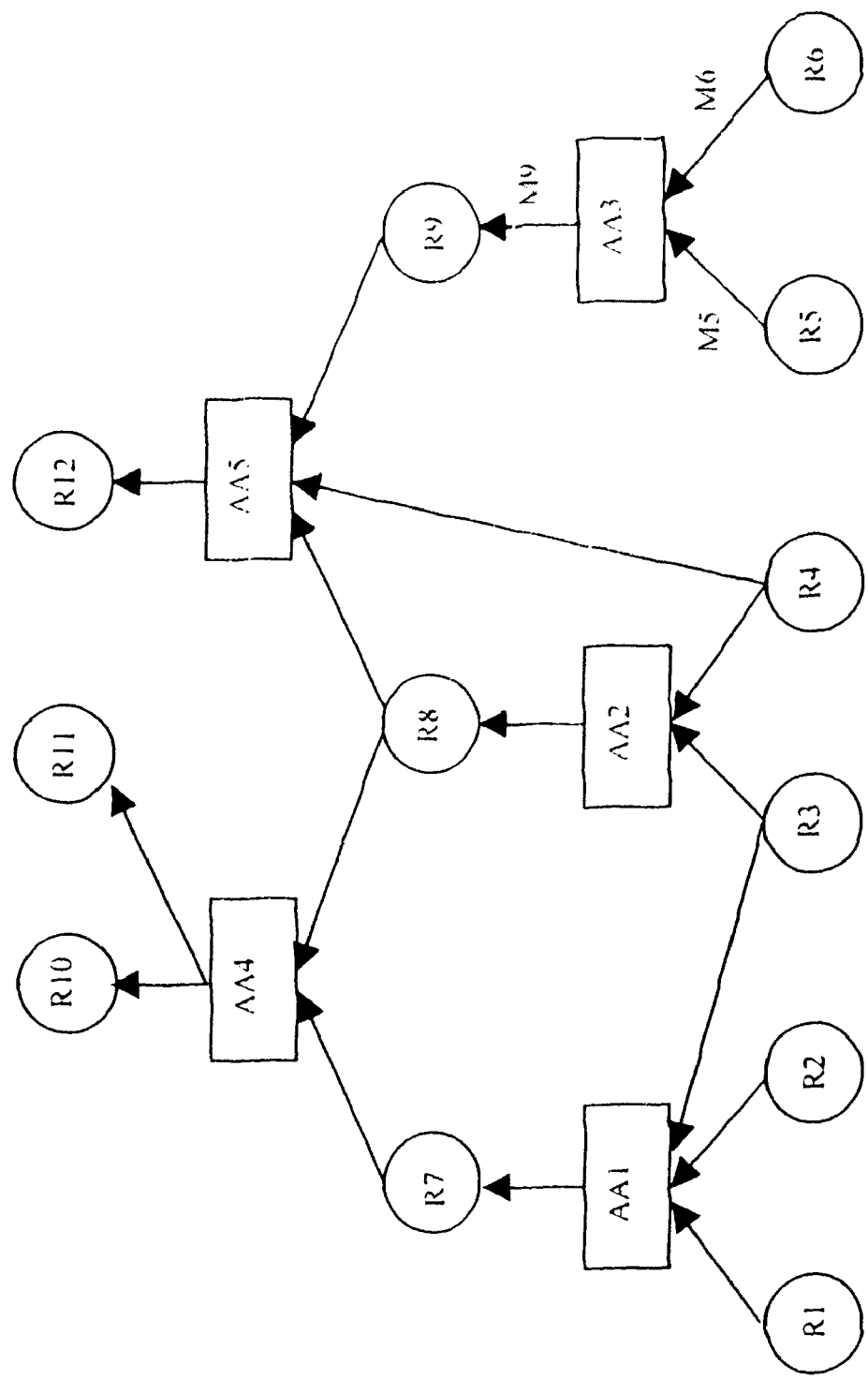
FIG. 2 is a block diagram showing an example of a metric network.

FIG. 2 conceptually shows an example metric network with twelve metric repositories (R1-R12) and five aggregation agents (AA1-AA5). In this example, repositories R1-R6 store primitive metrics; and repositories R7-R12 store derived metrics. Derived metrics are generated by aggregation agents, as shown in the figure that metric M9 is generated based on metrics M5 and M6 by agent AA3.

Conceptually, a metric (primitive or derived) can be viewed as a stream of data generated by a measurement device: some external device generates a primitive metric stream; an aggregation agent generates a derived metric stream. A metric data stream consists of many metric instances; each instance represents the measurement result obtained from a single measurement activity. A metric repository is the place where the whole data stream is persisted.

Besides the data stream, a metric repository also stores contextual information about the metric, which describes what this metric is about (semantics). A metric context consists of many slots; each slot has a name and a value. When design a metric, one has to decide what contextual information about the metric to include, put each piece of information into a context slot, give it a name (like Slot-1) and assign it a value (like Slot-1=123). Any metric has at least one context slot called Name; its value is the metric's name. Each metric has a unique name in a metric network.

Figure 3:
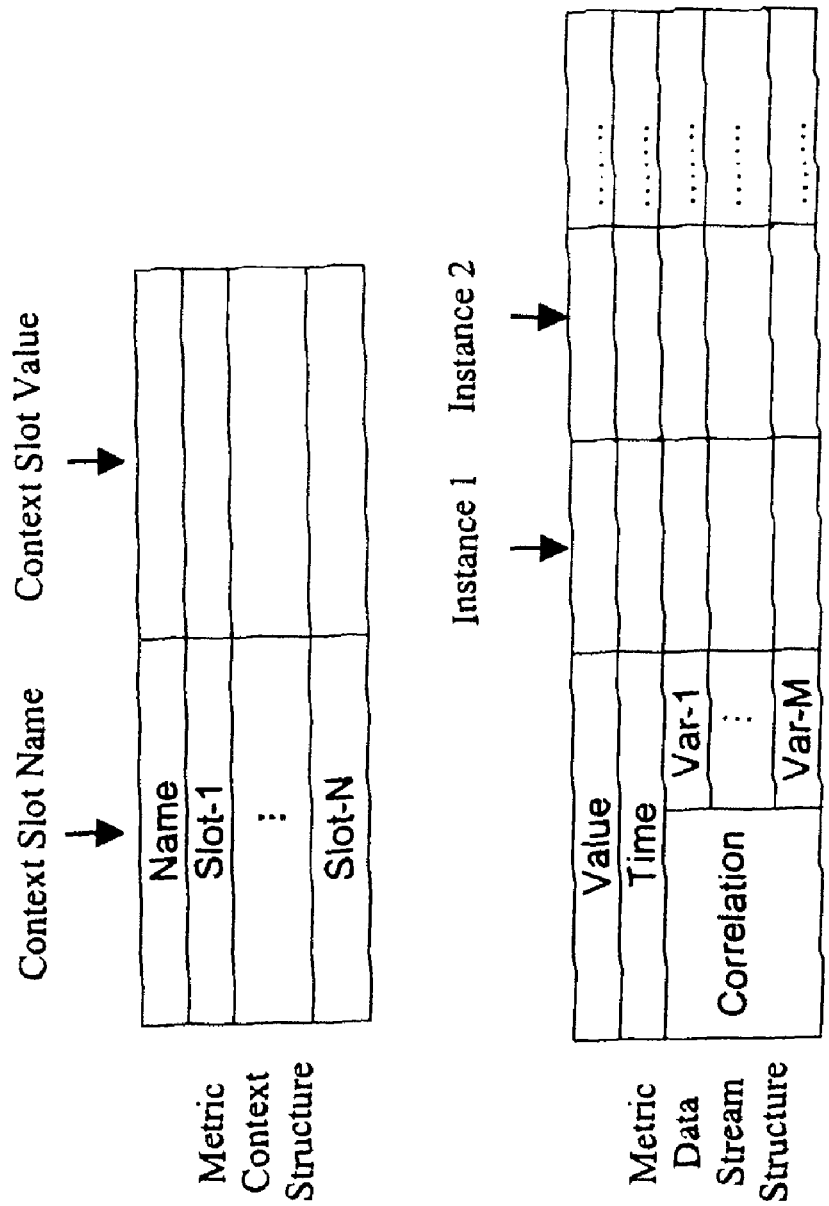
FIG. 3 is diagrams of metric context and metric data.

Each metric instance within a metric data stream contains three fields: Value, Time and Correlation. The Value field contains the measurement value of this instance; the Time field contains a timestamp of this instance, usually used to temporally correlate multiple metric instances; and the Correlation field contains values of user-defined correlation variables. They are used to capture other user-defined correlations between metric instances. When design a metric, one has to decide what correlation information to capture for each metric instance; represent each piece of information as a correlation variable and give it a name (like Var-1). The values of all three fields (Value, Time and Correlation) in a metric instance will be assigned by an aggregation agent when generating this instance. (For primitive metric instances, those values are assigned by the external devices that generate them.) FIG. 3 shows the structures of metric context and metric data.

In a metric network, metric repositories get metric instances generated by aggregation agents and store them; agents obtain metric instances from repositories to generate instances of high-level metrics (aggregation agents) or build metric relationship models (knowledge agents). All the repositories and agents follow a few well-defined procedures to communicate with each other.

Before entering into further discussion about these procedures, we describe how entities (repositories and agents) in a metric network find out which other entities they should communicate with. If an agent wants to receive new instances from a metric repository, it needs to register to this repository. Every time the repository receives a new instance; it forwards the instance to all the agents in the registry list. The same thing can be done for an aggregation agent, which may create new instances for multiple higher-level metrics. This communication pattern is called publication/subscription pattern. There are many ways to implement this pattern, refer to Section 6 for further discussion.

Figure 4:
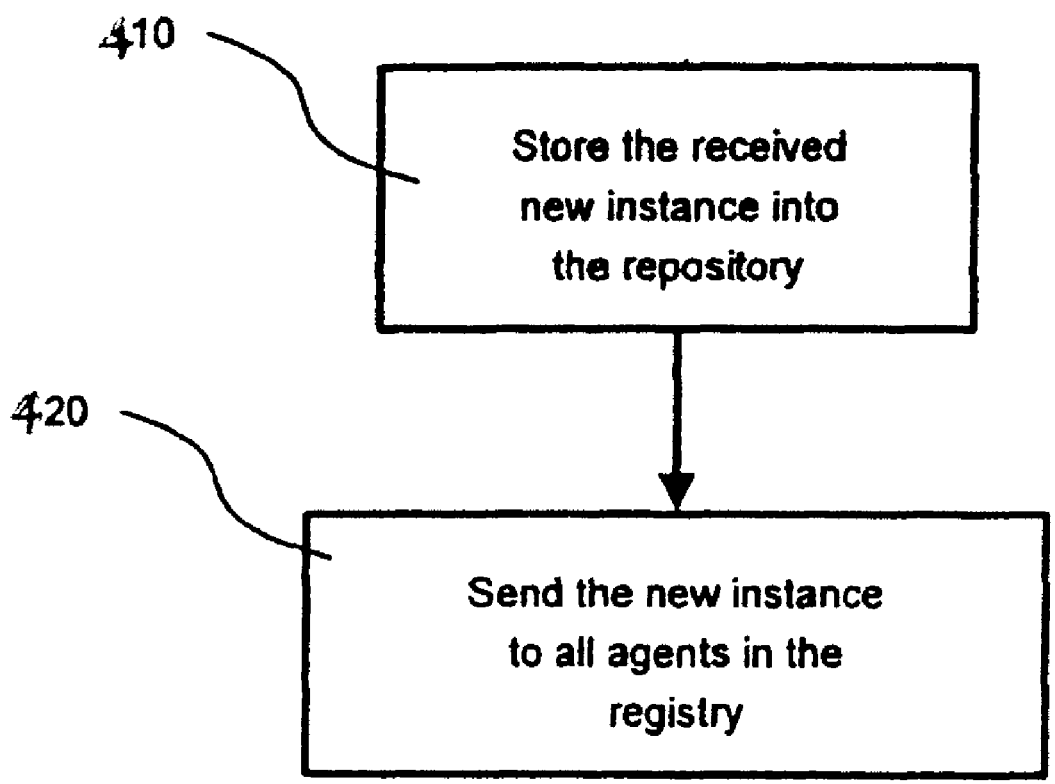
FIG. 4 is a flow diagram showing a generic procedure for a metric repository to publish new metric instances.

FIG. 4 illustrates the atomic procedure a metric repository executes after receiving a new metric instance. There are two steps to the procedure. The first step 410 is to store the received new instance into the repository. The second step 420 is to send the new instance to all agents in the registry.

An aggregation agent may need to perform computation asynchronously. To see this, consider this example: a new instance of metric A is generated every time a webpage is visited; an agent takes metric A as input and counts the number of visits in every half an hour. To do so, the agent needs to set up a clock to send itself a message in every half an hour.

Incoming metric instances may also trigger the agent to produce output. For example, an agent may create an instance of metric C after receiving three instances of metric D.

Figure 6:
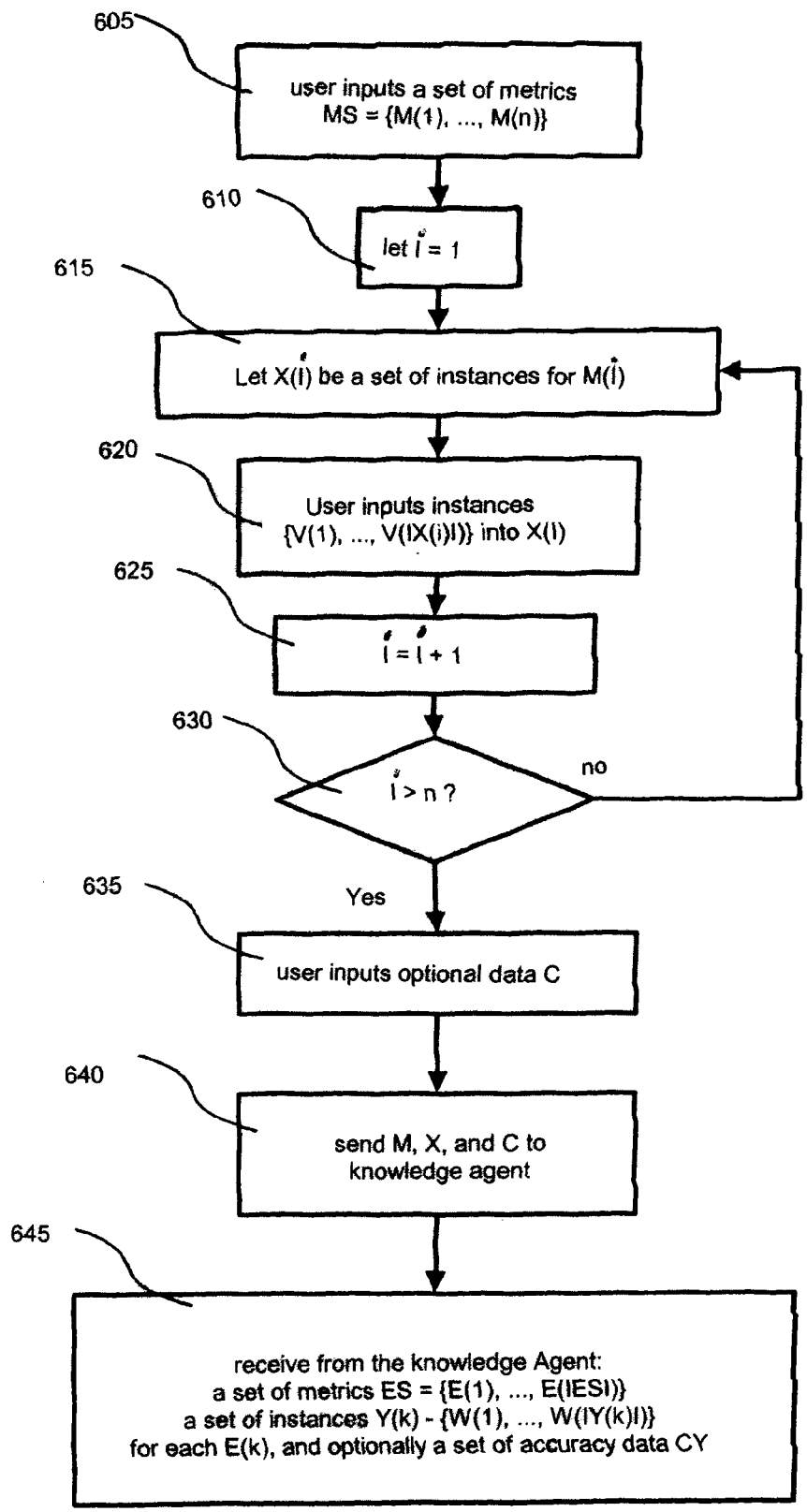
FIG. 6 is a flow diagram showing the logic of a what-if analysis procedure.

To summarize, an aggregation agent receives two types of messages: time events and metric instances; it checks thee incoming messages to decide whether new instances of higher-level metrics should be created. FIG. 6 illustrates the generic procedure every aggregation agent follows.

Figure 5:
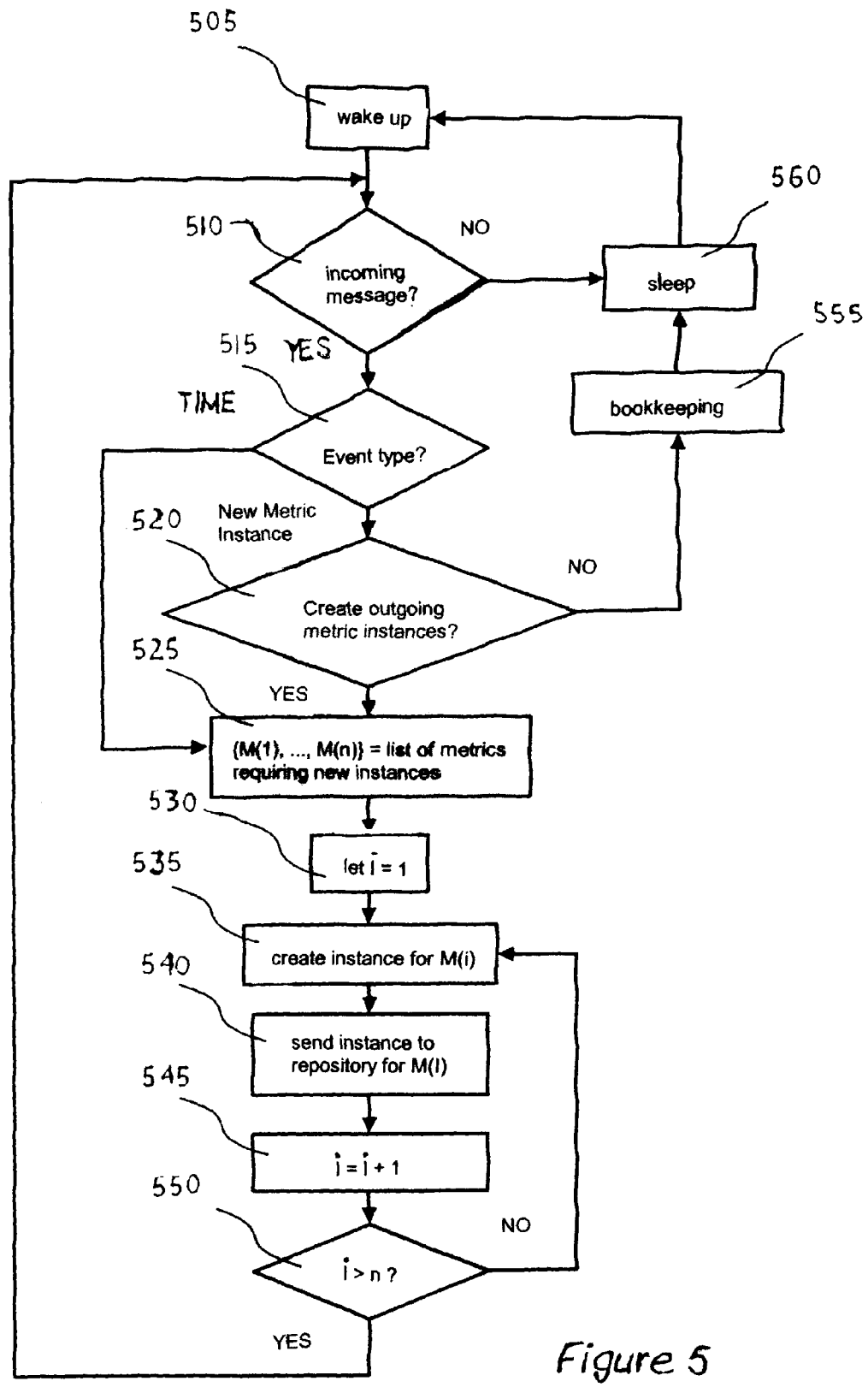
FIG. 5 is a flow diagram showing the logic of a procedure for aggregation agents.

Referring to the procedure in FIG. 5, the aggregation agent wakes up in step 505 because of the arrival of some number of messages. Step 510 checks if there is an incoming message. If yes, step 515 checks the message to see whether it is a time event or a new metric instance. If it is a time event, the control flow jumps to step 525. If the event type is the arrival of a new metric instance, step 520 determines if outgoing instances need to be generated. Outgoing instances may not be required if the instance in the message arrived out of order for example. If outgoing instances are not required, step 555 performs some book keeping (possibly storing the incoming instance in an internal cache) and goes to sleep (step 560). Otherwise, the aggregation agent gets a list of metrics for which new instances needed to be created in step 525 and enters a loop to process each of these metrics. For each of these metrics, step 535 creates a new instance, fills in the required fields, and step 640 sends the new instance to its associated repository. The aggregation agent then checks if there are anymore incoming messages in step 510. If all incoming messages have been processed, it goes to sleep.

Aggregation agents are always running. They are long-living entities. When there is no thing to do, they go to sleep. Incoming messages wake them up to do some work, and then they go to sleep again.

An aggregation agent can apply the above procedure to create multiple temporally correlated outgoing metrics. To do so, it simply creates the instances of these metrics at the same timing point, and marks the Time fields of these instances with that time.

By assigning the Correlation fields of outgoing metric instances with proper values, an aggregation agent can also correlate them according to arbitrary user-defined logic. Further more, if the values the Correlation fields of outgoing metric instances are assigned based on the Correlation fields of incoming instances; an agent can correlate the outgoing metric with incoming metrics. This feature can be used to trace the instances of a higher-level metric back to the lower-level metric instances they are depending on.

Metric instances can be received by an agent in a different order than the order they were sent out. When this happens, the agent needs to store the incoming instances into an internal cache and handle them at a proper time later. This is done in step 2 where the agent executes some book keeping functions.

A what-if analysis is an interaction between a user and a knowledge agent. The user assigns hypothetical values to some metrics, and feeds these values into a knowledge agent, which consequently returns its best estimate about the values of some other metrics of the concern. Besides hypothetical metric values, a knowledge agent may also take some user-defined additional data as input. These data include all external information that is not contained in the metric network. Since the output metric values from the knowledge are estimates, sometimes the agent also generates information about how accurate these values are, usually represented by probabilities. In general, a what-if analysis can be presented by the procedure shown in FIG. 6.

Referring to the procedure shown in FIG. 6, in step 605, the user selects a set of metrics $MS=\{M(i)\}$, where $1 \leq i \leq n$, n is the size of MS. The process is initialized in step 610 by setting $i=1$, and a processing loop is entered at step 615 where $X(i)$ is a set of instances for $M(i)$. For each metric $M(i) \in MS$, the user creates a metric instance set $X(i)=\{V(j)\}$ (step 420), where $V(j)$ is the j'th instance of metric $M(i)$, $1 \leq j \leq |X(i)|$ and fills in the values to the Value, Time and Correlation fields of each $V(j)$. The index i is then incremented by 1 in step 625, and a determination is made in step 630 as to whether i is greater than n. If not, the processing loop returns to step 615; otherwise, in step 635, the user may optionally input an additional data set C. In step 640, all the metrics MS, their instance sets $X(i)$, $1 \leq i \leq |MS|$, and additional data set C, are sent to a knowledge agent. In step 745, the output from the knowledge agent is received. The output consists of a metric instance set $Y(k)=\{W(l)\}$ as output for each metric $E(k)$ in a metric set $ES=\{E(k)\}$, where $1 \leq k \leq |ES|$, $1 \leq l \leq |Y(k)|$. The output may optionally include a data set CY that indicates how accurate the output metric values are.

A knowledge agent can be viewed as function $KA(\cdot)$ mapping sets $XS=\{X(i)\}$ and C to sets $YS=\{Y(k)\}$, i.e., $$YS=KA(XS,C). \quad (1)$$

This functional mapping is synchronized, meaning that given the inputs, the knowledge agent generates the outputs immediately; there is no time delay except the computation time.

There are two different approaches to implement a knowledge agent. One is to hard code function $KA(\cdot)$ into the agent. In this approach, the logic of function $KA(\cdot)$ needs to be known a priori; and once coded, this logic stays fixed. This approach is suitable when the relationship between the input sets XS and C, and output set YS is known and does not change frequently.

Another approach is to equip the agent with learning capabilities such that it can discover the function $KA(\cdot)$ autonomously. A learning algorithm takes a group of metric instance sets $CS_1$, $C_1$, $YS_1$, $XS_2$, $C_2$, $YS_2$, ..., $XS_T$, $C_T$, $YS_T$, and a group of additional data sets $D_1$, $D_2$, ..., $D_T$ as input, generates a function $KA_T(\cdot)$ (also called a learning model) to approximate $KA(\cdot)$. For each $1 \leq t \leq T$, $TR_t=\{XS_t, C_t, YS_t, D_t\}$ is called a piece of training data. (Some learning algorithms differentiate data that are actually used for training and the data that are used for validation; we do not make this distinction here and call all the input data as training data.) Suppose we knew the form of function $KA(\cdot)$, then each piece of raining data satisfies $YS_t=KA(XS_t, C_t)$ for $1 \leq t \leq T$. Sets $D_1$, $D_2$, ..., $D_T$ contain data that are not contained in the metric network but required by the agent for learning. Note the difference between $D_t$ and $C_t$. It is up to the designer of the knowledge agent to decide whether additional data $D_t$ is needed to build a learning model; the end users, who send what-if queries to the agent, do not even need to know the existence of $D_t$. On the other hand, if the what-if query contains an additional field C, $C_t$, representing the training data of C, must be included in the training set.

A knowledge agent can get training data from metric repositories either passively or actively. In a passive pattern, newest metric instances are sent to the agent once they are created. This is the same mechanism adopted by the aggregation agents to get the latest metric instances. In an actively pattern, the knowledge agents send out queries to retrieval metric instances it needs. Additional training data sets $D_1$, $D_2$, ..., $D_T$ are treated just like metrics: those data should have their own data stores, which should support the push and/or pull pattern depending on how the knowledge agent wants to access them.

A knowledge agent learns incrementally. Suppose an agent has already learned a function $KA_T(\cdot)$, it can take another group of training data with size S and produce another approximation $KA_{T+S}(\cdot)$. This learning process can be repeated continuously as more and more data are available. A knowledge agent has two basic methods to control the frequency it will learn: it can wake up to learn periodically under the control of a time clock, or it can pre-specify some metric instances and wake up every time when receiving them. The later method provides a great deal of flexibilities. For example, a knowledge agent can specify that it will wake up every time when receiving a metric instance with Name=XYZ, Value=123, etc. It can even be programmed to include a state-machine that will wake the agent up after receiving several metric instances in a specific pattern.

When receiving a what-if query, the approximation function learned is applied on the incoming query to generate an answer to it. As mentioned before, since the learned function $KA_T(\cdot)$ is an approximation to the real function $KA(\cdot)$, the output answers are estimates. In this case, the agent may also generates a data set CY, which contains information about how accurate these estimates are, i.e., $$CY,YS = KA_T(XS,C) \quad (2)$$

This process of applying the learned function occupies a separate thread within a knowledge agent. This ensures that the agent can answer what-if queries and learn in parallel.

To summarize, a knowledge agent receives three types of messages: what-if queries, time events, and metric instances. Here is the generic procedure for knowledge agents.

Figure 7:
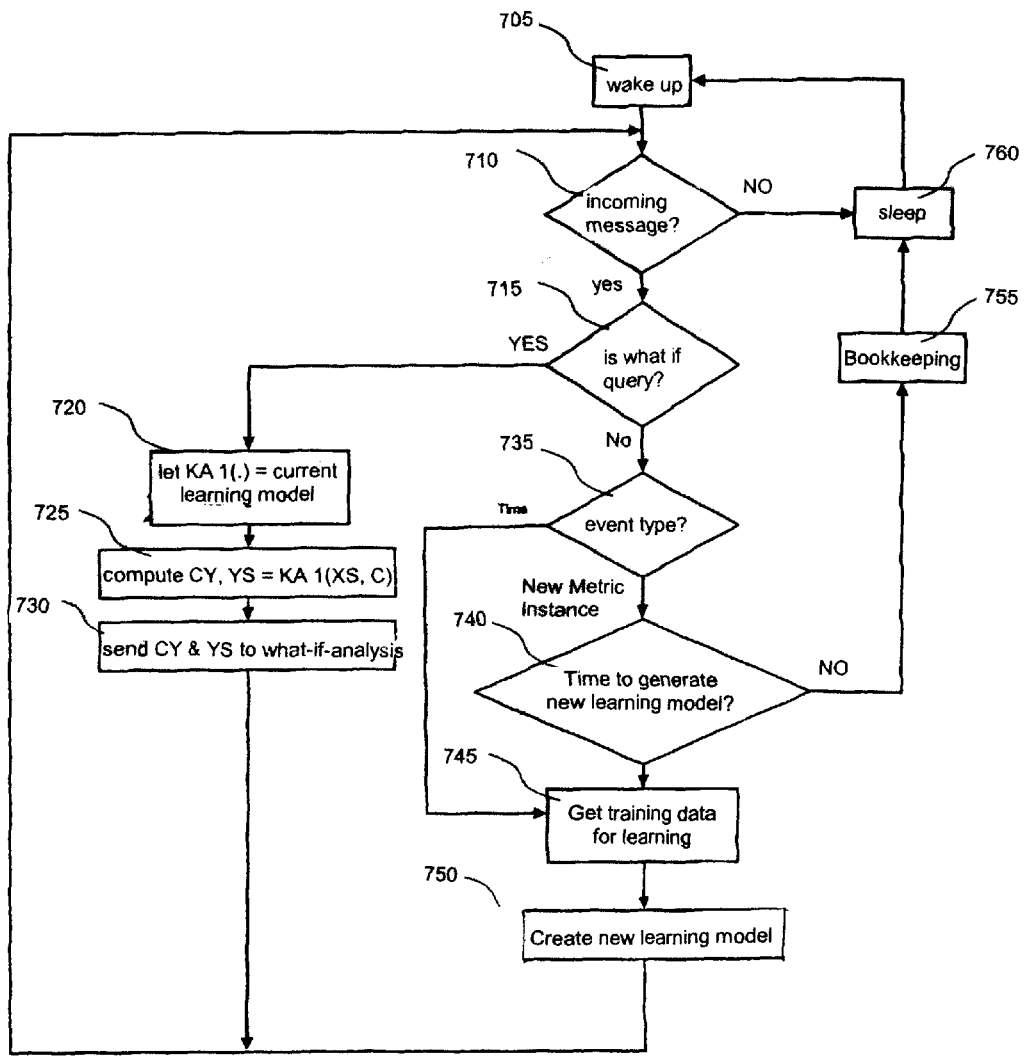
FIG. 7 is a flow diagram showing the logic of a procedure for knowledge agents.

Referring to the procedure in FIG. 7, in step 705 the knowledge agent wakes up because of some incoming messages. While there is an incoming message (step 710), it determines in step 715 if the message contains a what-if query? If yes, a separate processing thread is created that retrieves the current learning model (step 720), uses the model to compute CY and YS (step 725), and sends CY and YS to the What-If-Analysis procedure (FIG. 6) in step 730. If the message does not have a what-if query as determined in step 715, the incoming message is checked in step 735 to see whether it is a time event or a new metric instance. If it is a time event, the procedure goes to step 745 (start learning); otherwise, the incoming new metric instance is checked in step 840 to see whether it is time to generate a new learning model. If not, some book keeping is done in step 755, and the process goes to sleep in step 760. Otherwise, all the training data required for learning is retrieved (step 745), and a new learning model is created (step 750). The process then returns to step 710 to check for more incoming messages, and if thee are none, the process goes to sleep (step 760).

We can chain up many knowledge agents, feeding the output from a group of knowledge agents to another group of knowledge agents, to do deeper what-if analysis.

What-if queries are not necessarily created by users (as in the one-step what-if analysis shown above), or by other knowledge agents (as in the chained what-if analysis mentioned above). We can set a knowledge agent to automatically take the latest metric instances as incoming what-if queries and generate answers of these queries continuously. The output answers from this agent can be viewed as a predication of each metric in metric set ES={E(k)}. In this way, we can use the knowledge agent as an automatic metric predictor.

To facilitate administration and management of a metric network, we require all the entities in a metric network publish their meta-data in a single meta-data store.
1. All the metric meta-data about contextual structure and data structure should be published.
2. All metric repositories publish what metric it stores and data query interface (used to retrieval historical metric instances).
3. All aggregation agents publish the information about what their input and output metrics are.
4. All knowledge agents publish their what-if query formats, training data formats, and training data sources.

To add a new entity to a metric network, one has to first publish all the meta-data of this entity into the meta-data store and then deploy it.

A meta-data store can be implemented by different technologies, for example, databases, XML (eXtensible Markup Language) files, or even data files with proprietary formats, etc. A preferred implementation is using the XML technology, which provides standard data sharing mechanisms.

Similarly, many different technologies can be used to implement metric repositories. Since metric repositories need to store all the history metric data, database technology is a preferred choice.

Since aggregation agents are long-living entities, which keep aggregating low-level metric to form higher-level ones, they are usually implemented as background processes.

Knowledge agents answering what-if queries are usually implemented as services, since there are probably many users that use the same agent to analyze different scenarios at the same time. Knowledge agents that conduct automatic metric prediction can be implemented as background processes. Just like aggregation agents, they are long-living entities. To implement the passive communication pattern (newest metric instances are sent to the agents automatically by metric repositories), a message passing middleware that provides publication/subscription services is very helpful. With this service, each agent subscribes all the metrics it wants to receive; every time a new metric instance is published, the middleware makes sure that the agent receives it. The same thing can be done for each metric repository, which also subscribes the metric it is supposed to store.

A single aggregation agent usually generates temporally correlated metrics so that a single clock is used when generating these metrics. If one wants to use separate aggregation agents to generate temporally correlated metrics, one needs synchronize the clocks of these agents. One standard approach is to use Network Time Protocol.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for business performance monitoring, comprising:
   at least one client and at least one server;
   a receiver for receiving messages selected from the group consisting of time events and metric instances
   one or more metric repositories, associated with said at least one client or at least one server, that maintain metric instances received by said receiver, each of said metric instances containing a value, a time, and a correlation field, wherein said correlation field includes user-defined correlation variables which allow for correlations between metric instances;
   one or more aggregation agents that create higher-level metrics which are Key Performance Indicators from lower-level metrics based on said time events and said metric instances, wherein said aggregation agents create high-level metrics which are Key Performance Indicators in real time, wherein said higher-level metrics which are Key Performance Indicators are sent to said metric repositories; and
   means, associated with said at least one client or said at least one server, for
   learning at least one relationship between metrics stored in said metric repository,
   performing what-if analysis wherein said what if analysis comprises the steps of receiving hypothetical metric instances, applying a model of metric relationships, and generating estimated metric instances,
   outputting at least one model or tool in which Key Performance Indicators reflect every day operational measures in a timely fashion, and
   receiving, by a computer-based knowledge agent, hypothetic business scenarios followed by responding, by the knowledge agent, to the received hypothetical business scenarios with estimated outcomes.

2. The system of claim 1, wherein the metric repositories receive metric instances from business processes and aggregation agents;

store metric instances; and make received metric instances available.

3. The system of claim 1, wherein said means, associated with said at least one client or said at least one server, for learning at least one relationship between metrics stored in said metric repository receives metric instances as training data, and derives a model of metric relationships based on said training data.

* * * * *